Figure 1:
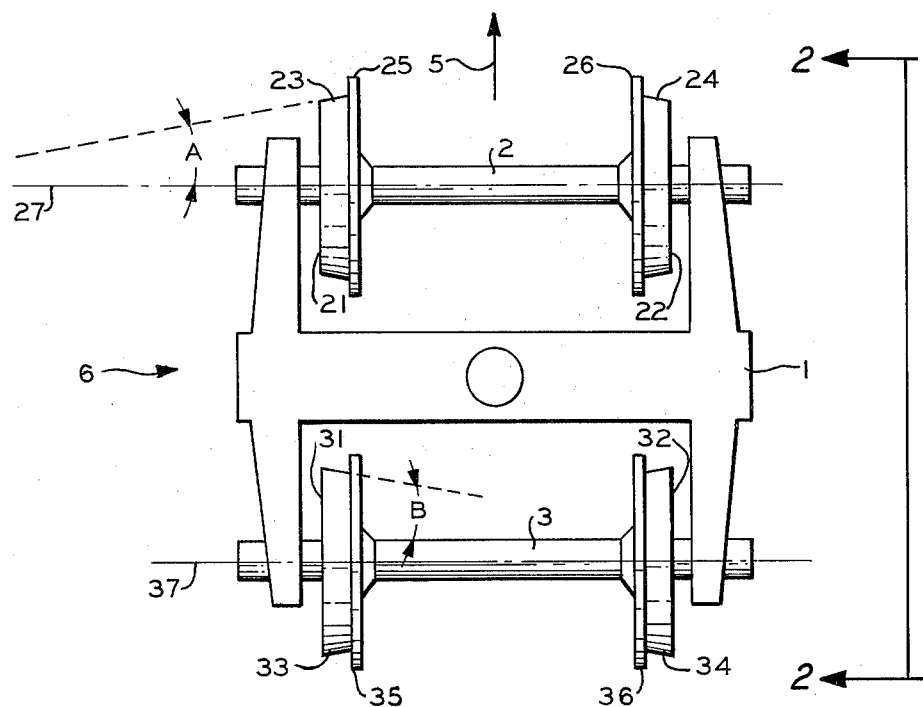

United States Patent [19]

Bennett

[11] 4,095,531

[45] Jun. 20, 1978

[54] RAILCAR RUNNING GEAR

[75] Inventor: Richard J. Bennett, Bartlesville, Okla.

[73] Assignee: Phillips Petroleum Company, Bartlesville, Okla.

[21] Appl. No.: 693,983

[22] Filed: Jun. 8, 1976

[51] Int. Cl.² ............................................. B61F 5/00
[52] U.S. Cl. ................................. 105/182 R; 295/34; 105/168
[58] Field of Search ............... 105/181, 182, 175, 157, 105/165–170; 295/1, 31 R, 31 A, 32, 33, 34

[56] References Cited

U.S. PATENT DOCUMENTS

| 95,051 | 9/1869 | Sheffield et al. | 295/34 X |
| 157,400 | 12/1874 | Howard | 295/34 X |
| 227,205 | 5/1880 | Bedell | 295/31 R X |
| 468,110 | 2/1892 | Hunt | 295/34 X |
| 2,052,660 | 9/1936 | Rocard | 295/34 X |
| 3,902,433 | 9/1975 | Borchert et al. | 105/182 R X |

Primary Examiner—Drayton E. Hoffman
Assistant Examiner—Donald W. Underwood

[57] ABSTRACT

A railcar running gear or a wheel unit for railcars with at least two essentially parallel axles with two wheels on each axle is provided for, of which the front two wheels have a roll surface touching the rail that is slightly tapered so that the smaller diameter of the roll surface is located at the outside and the larger diameter of the roll surface is located at the inside of the wheel, and the rear two wheels have a roll surface touching the rail that is slightly tapered so that the smaller diameter of the roll surface is located at the inside and the larger diameter of the roll surface is located at the outside of the wheel.

5 Claims, 4 Drawing Figures

RAILCAR RUNNING GEAR

The present invention relates to railcars. More specifically, the present invention relates to running gears or wheel arrangements of railcars. In one of its aspects, the invention relates to unidirectional trains.

BACKGROUND OF THE INVENTION

Railcars are presently essentially built of two wheel units of four wheels each carrying a main car body. Each wheel unit comprises two axles with two wheels each fixedly connected to the axle. These axles are arranged with relatively small distance from each other in a base element or frame forming a wheel unit or running gear. The main body of the railcar is carried by two such wheel units.

The wheels are frequently built to have a slightly tapered roll surface, which tapers towards the outside of the unit. In other words, the tapered roll surface of each wheel has a larger diameter at the inside than at the outside of the wheel. The insides of the two wheels on one axle are facing each other, whereas the outsides of the two wheels on one axle are facing away from each other.

During the operation of such railcars, an oscillating or "hunting" is observed. This hunting is a periodic turning of the wheel units that can result into a dancing of the railcar, particularly when the railcar is empty and the car moves at a normal traveling speed of around 40 to 60 miles per hour. This dangerous oscillating causes the railcars to ride unevenly. Furthermore, the oscillating causes high maintenance costs for rails and railcars, see particularly "Railway Age", Nov. 24, 1975, Vol. 176, No. 22, page 40, center column.

THE INVENTION

It is thus one object of this invention to provide an improved railcar.

Another object of this invention is to provide a wheel unit for a railcar which is stabilized against oscillations caused by the tapered wheels.

A further object of this invention is to provide a self-stabilizing unidirectional railcar.

Figure 2:
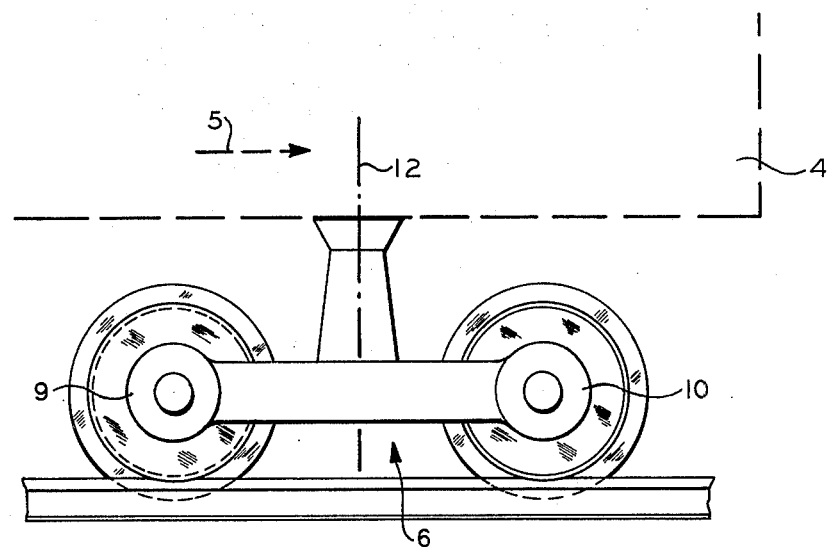
Figure 3:
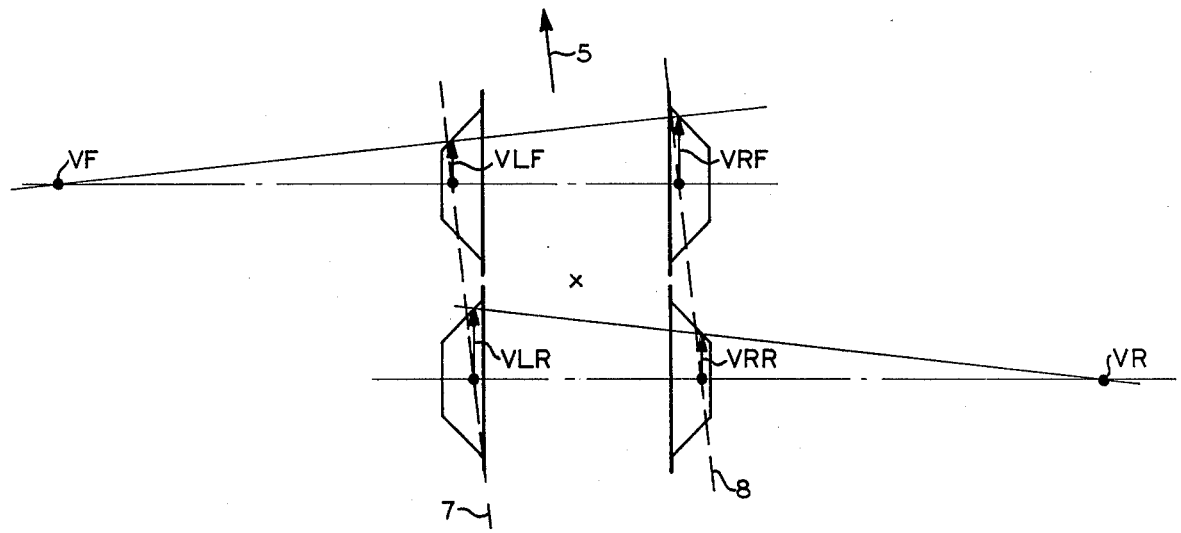
Figure 4:
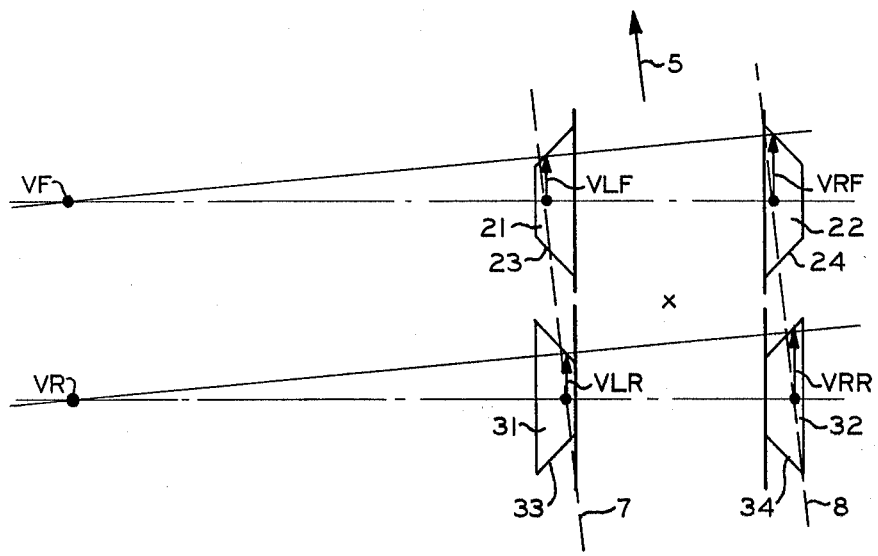

These and other objects, advantages, details, features and embodiments of this invention will become apparent to those skilled in the art from the following detailed description of the invention, the appended claims and the drawing of which FIG. 1 shows a top view of a wheel unit in accordance with this invention, FIG. 2 shows a side view of the wheel unit shown in FIG. 1, FIGS. 3 and 4 show a schematic sketch of a known wheel unit and respectively the wheel unit of this invention to show the stabilizing effect of the wheel unit of the present invention.

In accordance with this invention, there is now provided a wheel unit comprising a base element to which two axles carrying the weight are attached rotatably and essentially parallel to each other. The important feature of this invention is the fact that the two wheels attached to one axle have roll surfaces that are tapered at a different degree than the two wheels attached to the other axle. Preferably the two wheels attached to one axle are tapered so that the roll surface of each wheel converges away from the other wheel, whereas the roll surface of the other two wheels is tapered so that each roll surface converges towards the other wheel.

The distance between the parallel axles of the wheel unit of this invention is preferably 66 to 72 inches (168 to 183 cm.). More preferably still, the distance between the parallel axles is 70 inches (178 cm.). The distance between the inside surfaces of the two rails is 56.5 inches (143.5 cm.).

Preferably, each wheel is provided with a flange portion at the inside of the wheel. This flange portion as such is well known in the art. One of its purposes is to guide the wheel through switches.

In the following, further details and embodiments of the invention will be described relating particularly to the arrangement of a first axle carrying wheels with outwardly tapered roll surfaces and the second axis carrying wheels with inwardly tapered roll surfaces. In this connection, the first axle carrying the wheels with the outwardly tapered roll surface is also referred to as the "front axle" and correspondingly, the wheels are referred to as the "front wheels"; similarly, the second axle carrying the wheels with the inwardly tapered roll surface is referred to as the "rear axle" and correspondingly, the wheels of this axle are referred to as the "rear wheels". The reason for this designation is that the particular advantages of this invention, as will be explained later, are achieved when the wheels having the roll surface tapered such that they converge slightly to the outside are the front wheels and correspondingly, when the wheels having a roll surface tapered such as to converge slightly towards the inside are the rear wheels. The words "front" and "rear" refer to the direction of movement of the wheel unit.

Therefore, the preferred application of the invention and the preferred embodiment of the invention is a railcar or a unidirectional train comprising a main body and two units as defined above rotatably attached to the front and rear portion of the main body. The wheels with the roll surface tapered, such as to converge slightly towards the outside in both wheel units, will be the front wheels of the wheel unit and the other two wheels will be the rear wheels.

The slightly tapered roll surface of the wheel units of this invention preferably are approximately frustonconically shaped surfaces. Preferably both the front and the rear wheels have the roll surface tapered at an angle of about 2° to about 4°. This angle is the angle between the roll surface and the wheel axis (see A and B, respectively, in FIG. 1 of the drawing).

Furthermore, the wheel unit can be equipped with all elements known in the art such as bearings, springs, brakes, etc. Since the presence and construction of these details depend upon the particular application of the wheel unit, and since these are also well known in the art, a detailed description thereof can be avoided.

The invention will still be more fully understood from the following description of the drawings. In FIGS. 1 and 2, a top and side view of the wheel unit, in accordance with this invention, is shown. In frame 1, two axles, one front axle 2 and one rear axle 3, are rotatably arranged in bearings 9 and 10, respectively. The front axle carries two wheels, 21 and 22, the rear axle carries two wheels, 31 and 32. Each wheel has a roll surface 23, 24 and 33, 34, respectively, and an inside flange portion 25, 26 and 35, 36, respectively. The front wheels 21 and 22 have roll surfaces that are tapered, converging towards the outside. The angle A between the roll surface and the axis 27 of the axle 2 is in a specific example about 2°, 50'. In accordance with this invention, the rear wheels 31 and 32 instead of having a roll surface converging slightly towards the outside, are provided with a roll surface converging slightly towards the inside. The angle B, between the roll surface 33 and 34, respectively, and the axis 37 in this specific example, is about 2°, 50'.

The wheel unit shown in top view and FIG. 1 can carry the end of a rail car body 4 as schematically indicated by the dotted lines in FIG. 2. The direction of movement of this railcar is indicated by arrow 5. The wheel unit 6 is connected to the body 4 in such a manner that it can rotate relative to the body 4 around the normally essentially vertical axis 12.

For an explanation of the advantageous results that can be achieved by the wheel unit of this invention, reference is now made to FIGS. 3 and 4. FIG. 3 shows schematically a standard wheel unit with the front and rear wheels having a tapered roll surface that converges for all the four wheels slightly toward the outside. Thus the larger diameter of the roll surface is arranged close to the flange of the wheel or at the inside of the wheel, whereas the smaller diameter of the roll surface is arranged at the outside of the wheel. This wheel unit is shown in a position not parallel to the rails 7 and 8. The angles are exaggerated for explanatory purposes. In FIG. 4 the arrangement of this invention is shown in the same position as that of FIG. 3. The arrangement shown in FIG. 4 is in accordance with this invention showing the rear wheels 31 and 32 having a roll surface 33 and 34 converging towards the inside.

Because the wheels are fastened to the axles, 2 and 3 respectively, the two wheels on each axle must turn at the same velocities. With the front axle in FIG. 3 displaced to the right, the right wheel tries to travel further than the left wheel and thus the axle pivots to the left. The reverse is true for the rear axle.

FIG. 3 shows that the displaced position of the front wheels will cause a turning momentum around point VF, whereas the rear wheels will cause a turning momentum around the point VR. These two momentums counteract each other so that no stabilization is reached. The reason for the momentums described is that the wheels fixed to the axles touch the rails 7 and 8 at different positions of their tapered roll surface and thus, at the same rpm of the axle, have different circumferential speeds VRG, VLF, as well as VLR and VRR, respectively. Opposite to the situation shown in FIG. 3, the rear wheels of the wheel unit of this invention shown in FIG. 4 achieve a momentum in the same direction as the front wheels around point VR, because VLR is also smaller than VRR (whereas the prior art wheel unit shown in FIG. 3 shows VLR being larger than VRR). For the same reason given above, however, the reverse motion of the wheel unit in accordance with this invention will be unstable. Therefore, such a reverse motion is either to be avoided or additional safeguards have to be used to prevent the unwanted rotation of such a wheel unit. For this reason the wheel unit of this invention most preferably is being used in connection with unidirectional trains, i.e., trains in which the individual railcars move only in one direction.

Another benefit of the invention is that wear on the rail is divided rather than applied only to one side — the latter problem makes it necessary to rotate the rails.

Reasonable variations and modifications, which will become apparent to those skilled in the art, can be made from this invention without departing from the spirit and scope thereof.

I claim:
1. A wheel unit for railcars comprising
   a. a base element,
   b. a first axle rotatably arranged in said base element,
   c. a second axle arranged rotatably and essentially parallel to said first axle in said base element,
   d. four wheels, with
   e. a first set of two wheels, each being coaxially attached to said first axle, each of these wheels having a tapered roll surface with only one taper; said taper is slightly converging away from the other wheel of said first set, and
   f. a second set of two wheels, each being coaxially attached to said second axle, each of these wheels having a tapered roll surface with only one taper; said taper is slightly converging toward the other wheel of said second set of wheels,
   whereby the wheel unit is stabilized against oscillations caused by the tapered wheels.
2. A wheel unit in accordance with claim 1 wherein the roll surface of all four wheels is frustoconically shaped, wherein the angle between the axle and the frustoconical surface is about 2° to about 4°.
3. A wheel unit in accordance with claim 1 wherein the distance between the axles is about 66 to about 72 inches.
4. A wheel unit in accordance with claim 1 wherein each wheel is equipped with a flange portion at the inside of the wheel that has a diameter considerably larger than the largest diameter of the tapered roll surface.
5. A wheel unit in accordance with claim 1 wherein the base element is attached to a main body of a railcar in such a manner that the wheel unit can rotate relative to said main body around a normally vertical axis.

* * * * *